United States Patent [19]

Smeal et al.

[11] Patent Number: 5,534,211
[45] Date of Patent: *Jul. 9, 1996

[54] LAMINATING RESINS HAVING LOW ORGANIC EMISSIONS

[75] Inventors: Thomas W. Smeal, Murrysville Boro; George L. Brownell, Mount Lebanon Township, Allegheny County, both of Pa.

[73] Assignee: Aristech Chemical Corporation, Pittsburgh, Pa.

[ * ] Notice: The term of this patent shall not extend beyond the expiration date of Pat. No. 5,492,668.

[21] Appl. No.: 239,061

[22] Filed: May 6, 1994

Related U.S. Application Data

[63] Continuation-in-part of Ser. No. 75,432, Jun. 14, 1993, Pat. No. 5,393,830, which is a continuation-in-part of Ser. No. 24,022, Mar. 1, 1993, abandoned.

[51] Int. Cl.⁶ .......................... B29C 41/02; B29C 41/08
[52] U.S. Cl. ........................................... 264/308; 264/309
[58] Field of Search .................................. 427/202, 206, 427/407.1, 421; 264/308, 309

[56] References Cited

U.S. PATENT DOCUMENTS

| | | | |
|---|---|---|---|
| 3,983,185 | 9/1976 | Dorfman et al. | 260/863 |
| 4,233,432 | 11/1980 | Curtis | 528/298 |
| 4,289,684 | 9/1981 | Kallaur | 260/40 R |
| 4,465,806 | 8/1984 | Lee | 525/31 |
| 5,202,366 | 4/1993 | Reid et al. | 523/516 |

FOREIGN PATENT DOCUMENTS 0234692  9/1987  European Pat. Off. .

OTHER PUBLICATIONS

Lubin, G. *Handbook of Composites*, pp. 20, 29, 30, Van Nostrand Reinhold Co. N.Y. (1982).

Sartomer Company, West Chester, Pa. 19382; Product Bulletin: SARTOMER 348 (Ethoxylated Bisphenol A Dimethacrylate).

*Primary Examiner*—Patricia A. Short
*Attorney, Agent, or Firm*—William L. Krayer; Robert R. Gavlik

[57] ABSTRACT

A method of laminating a solid formed body utilizing a laminating resin characterized by low volatile emissions is made from (1) an unsaturated polyester resin comprising maleic acid, phthalic acid, glycol(s), and dicyclopentadiene, (2) a diacrylate or dimethacrylate of alkoxylated bisphenol-A, and (3) a compound selected from the group consisting of ethylene glycol dimethacrylate, vinyl toluene, styrene, and divinyl benzene.

7 Claims, No Drawings

LAMINATING RESINS HAVING LOW ORGANIC EMISSIONS

RELATED APPLICATION

This is a continuation-in-part of our application Ser. No. 075,432, filed Jun. 14, 1993, now U.S. Pat. No. 5,393,830, which is a continuation-in-part of our application Ser. No. 024,022, filed Mar. 1, 1993, now abandoned.

TECHNICAL FIELD

This invention relates to resin compositions which cure as they are shaped, laminated, brushed, sprayed or otherwise placed into the space where they are to form a product; such resins are broadly known as laminating resins, commonly have an unsaturated polyester resin base, and nearly always are employed in a solution of an organic monomer such as styrene. The organic monomer is intended to copolymerize with the resin but typically and notoriously tends also to volatilize in significant amounts into the workplace environment. The present invention is a composition which can be used in existing equipment, procedures, and workplaces, but which will emit far less monomer than the typical laminating resin heretofore.

BACKGROUND OF THE INVENTION

Many attempts have been made to devise laminating resins having low volatile emissions and still meet the physical specifications and other desirable properties of the end products, while remaining relatively easy to use. In Lee U.S. Pat. No. 4,465,806, for example, a more or less conventional unsaturated polyester resin is combined with, instead of the usual styrene, a reaction product of a polyepoxy compound and acrylic or methacrylic acid which may be the diacrylate of a polyglycidyl ether of bisphenol-A. These compounds are made from epoxy compounds, and the author of U.S. Pat. No. 4,465,806 requires that a significant portion of the epoxy groups be unreacted for use in their resin. Moreover, unlike the present invention, they form pendant OH groups.

Ethoxylated, difunctional, bisphenol-A has been used in the past as an ingredient in various types of resins, generally resins which include a significant diisocyanate component, as in Ford, Jr. et al U.S. Pat. No. 3,876,726.

European Patent Application 0 234 692 discloses a composition said to be useful as a molding resin, having the virtue of a low residual monomer concentration in the final product. The gist of the disclosure appears to be that dimethacrylates such as ethoxylated bisphenol-A dimethacrylate can be used as components of otherwise more or less conventional unsaturated polyester resins to reduce the amount of residual styrene monomer in contained molding processes such as cell molding, compression molding, and sheet molding. See also Reid and Rex U.S. Pat. No. 5,202,366, which includes a low-profile additive in a similar composition.

Laminating resins are expected to cure relatively quickly, since they are (typically) sprayed in many layers. Moreover, they cure at ambient temperatures rather than elevated temperatures such as are used in confining molds. In addition, as will be shown later herein, many monomers, such as vinyl and acrylic monomers, may not be compatible with the base resin. Thus it is difficult to design a good laminating resin satisfying the many commonly recognized desirable criteria.

The daunting problem of volatile emissions during spray-up or other laminating procedures has until now been unsolved. Applicants' dramatic results detailed herein show that lamination can be used with significantly reduced emissions in the workplace.

SUMMARY OF THE INVENTION

Our new laminating resin comprises three major components. The first is a base resin comprising dicyclopentadiene, glycols, and unsaturated dicarboxylic acids; optionally the base resin may also contain a saturated dicarboxylic acid. In polymeric form, they are typically maleic and phthalic acid residues, with optional isophthalic residues, interspersed with glycol residues. These glycols are commonly ethylene glycol, diethylene glycol, propylene glycol and dipropylene glycol, usually as mixtures, but many other glycols can be utilized; dicyclopentadiene is also included as well, in amounts from 1% to 60% of the base resin. The second component is a diacrylate or dimethacrylate of alkoxylated bisphenol-A of formula (I):

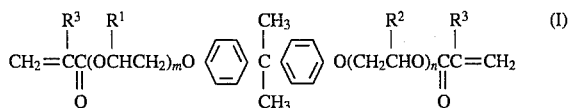

where m and n are independently numbers from 1 to about 10, and $R^1$ and $R^2$ are independently, in each alkoxy group, hydrogen or $CH_3$ and $R^3$ is also independently hydrogen or $CH_3$. These two major ingredients may be present in weight ratios of about 1.5:1 to about 0.6:1. We have found that, surprisingly, this combination of ingredients apparently suppresses the volatilization of the third component, which is a compound selected from the group consisting of styrene, vinyl toluene, divinyl benzene, and ethylene glycol dimethacrylate. The third component may be present in amounts from 25 to 65% based on the total of the base resin and the second component (I).

The combination of the two basic ingredients, the base resin including DCPD, and the ethoxylated BPA dimethacrylate, without any additional monomers, has been found to be difficult to work with in practice primarily because of its viscosity. When a monomer such as vinyl toluene or ethylene glycol dimethacrylate is added to the combination, the viscosity can be adjusted with some precision, but the emission test results are, surprisingly, quite low, as will be seen herein. The composition may also include up to about 10% cyclohexyl methacrylate (CM) based on the composition as a whole, also as an additional monomer and for its utility in viscosity adjustment.

The ingredients listed above are employed in our invention to achieve a viscosity about 100 to about 400 cps.

To illustrate the difficulty of finding a "monomer" which is both compatible with the first two components and provides a workable viscosity, we provide the results of the following table, wherein various monomers were screened for compatibility with a resin having the following ingredients:

| | |
|---|---|
| Base Resin* | 60 parts by weight |
| 12% Cobalt (Promoter) | 00.30 |

-continued

| | Parts by weight |
|---|---|
| Potassium (Co-promoter) | 00.20 |
| N,N-Dimethylacetoacetamide (Accelerator) | 00.30 |
| DDM-9 (Initiator) | 01.50 |
| Monomer (as indicated below) | 40 |

| *Base Resin (Polymer) | Parts by weight | lbs/100 lbs | lbs/60 lbs |
|---|---|---|---|
| Propylene Glycol | 22.788 | 31.97 | 19.18 |
| Diethylene Glycol | 04.937 | 6.93 | 4.16 |
| Phthalic Anhydride | 32.734 | 45.92 | 27.55 |
| Maleic Anhydride | 10.820 | 15.18 | 9.11 |
| | 71.279 | 100.00 | 60.00 |

| Monomer | Mod L[1)] | Viscosity | Exotherm °F. | Gel Time min:sec | Interval min:sec |
|---|---|---|---|---|---|
| Styrene | 0.120 | low | 335 | 4:30 | 4:39 |
| Vinyl Toluene | 0.120 | low | 317 | 4:50 | 5:04 |
| Diallyl phthalate | 0.000 | high | 119 | 19:27 | 27:43 |
| Methacrylates | | | | | |
| n-butyl | 0.001 | low | 186 | 40:58 | 5:28 |
| n-hexyl | 0.001 | incompatible | | | |
| isodecyl | 0.001 | incompatible | | | |
| cyclohexyl | 0.001 | high* | 287 | 16:50 | 3:50 |
| 2-phenoxyethyl | 0.001 | high | 196 | 8:45 | 3:29 |
| allyl | 0.001 | low | 331 | 18:20 | 3:37 |
| 2-hydroxyethyl | 0.001 | low | 247 | 4:48 | 3:35 |
| 2-hydroxyethyl | 0.010 | low | 249 | 4:30 | 3:20 |
| dicyclopentyl | 0.001 | very high | 199 | 3:40 | 4:11 |
| isobornyl | 0.000 | incompatible | | | |
| isophoronyl | 0.010 | incompatible | | | |
| Dimethacrylates | | | | | |
| 1,6-hexanediol | 0.001 | high | 241 | 7:54 | 3:34 |
| ethylene glycol (EG) | 0.001 | low | 275 | 2:48 | 3:37 |
| ethylene glycol | 0.005 | low | 274 | 2:52 | 3:50 |
| diethylene glycol | 0.001 | medium | >210 | 4:03 | 2:12 |
| diethylene glycol | 0.010 | medium | 252 | 5:40 | 3:13 |
| triethylene glycol | 0.001 | medium | 241 | 3:18 | 3:17 |
| tetraethylene glycol | 0.001 | medium | 229 | 2:52 | 3:46 |
| neopentyl glycol | 0.001 | high | 235 | 4:20 | 4:09 |
| ethoxylated BPA | 0.001 | very high | 171 | 8:50 | 7:30 |
| C14 diol | 0.001 | incompatible | | | |
| Trimethacrylate | | | | | |
| trimethylol propane | 0.001 | high | 228 | 2:28 | 4:25 |
| Mixtures | | | | | |
| 30 EG dimethacrylate/ 10 N-vinyl pyrrolidinone | 0.010 | medium | 295 | 1:49 | 3:12 |
| 30 EG dimethacrylate/ 10 divinyl benzene | 0.010 | medium | 286 | 3:11 | 3:29 |
| 30 vinyl toluene/ 10 N-vinyl pyrrolidinone | 0.200 | low | 289 | 16:10 | 4:44 |

*This was considered unsatisfactory, but when ethoxylated BPA dimethacrylate was included to make a 3-part mixture, viscosity was lowered.
[1)]Mod L is 25% hydroquinone in propylene glycol.

It will be seen from this table that the utility of a prospective monomer in a laminating composition including ethoxylated BPA dimethacrylate is, to say the least, difficult to predict. The properties shown are in any event considered to be preliminary, or threshold properties.

Our invention includes a method of laminating a solid formed body without creating significant volatile emissions in the workplace comprising (a) providing a forming surface having a desired positive or negative shape, (b) providing a liquid mixture comprising (1) about two parts by weight unsaturated polyester resin including 1% to about 60% dicyclopentadiene, based on the mixture, (2) about one part to about four parts by weight alkoxylated bisphenol-A diacrylate or dimethacrylate, (3) about 20% to about 60%, based on the total weight of (1) and (2), of a compound selected from the group consisting of styrene, vinyl toluene, ethylene glycol dimethacrylate, and divinyl benzene, and (4) an effective amount of a polymerization catalyst, (c) applying said mixture to said forming surface at ambient temperatures in layers while permitting said layers incrementally to polymerize, thereby building said shaped article without creating significant volatile emissions, and (d) removing the finished solid formed body from said forming surface.

DETAILED DESCRIPTION OF THE INVENTION

While the problem at hand is to create a formulation which drastically differs from commercial standard laminating resins in terms of volatile emissions during application, the market dictates that it must be accomplished without significantly altering the widely used equipment and techniques of application. Accordingly, the following criteria are to be kept in mind at all times:

1. Reduced emission of volatile organic compounds—regulations will become more stringent with time.
2. Less potential hazard to human health and the environment—regulations will also become more stringent with time.
3. Minimal increase in cost when commercialized, and reason to believe cost will be reduced in the long run.
4. Compatibility between components of the resin system.
5. Reactivity that is similar to that of common commercial polyester resins.
6. Viscosity that is similar to that of common commercial polyester resins— 100 to 400 cps.
7. Physical properties similar to or better than those of common commercial polyester resin.
8. Ability to wet glass and bond to other components of an assembly.

Persons skilled in the art will realize that number 7, relating to physical properties of the final product, can by itself include several important specifications. Thus, the problem is not simply one of finding a monomer which is not as volatile or objectionable as the common solvents. Rather, many criteria have to be balanced, and, with thousands of chemicals to consider, analysis of the combinations and their effects is extremely difficult. One must decide on the important functions and properties, settle on a systematic but simple screening process, and try to develop a short list of prospective formulations which have a good chance of meeting all the criteria within a practical time period.

The proliferation of input variables to attain these objectives may be further appreciated by considering the more or less conventional unsaturated polyester compositions which may be used as a base. They are prepared by polycondensation of polycarboxylic acid derivatives, one of which must be an alpha, beta-ethylenically unsaturated polycarboxylic acid, and polyols. By polycarboxylic acid derivatives we mean to include polycarboxylic acids, their esters of lower alcohols, their acid chlorides and their anhydrides.

In the absence of dicyclopentadiene, the ratio of polycarboxylic acid to polyol is usually a 1:1 molar ratio. However, in most esterification processes, a slight excess of polyol is utilized to compensate for polyol losses during esterification. Also, although dicarboxylic acids and diols are most frequently utilized and the 1:1 molar ratio is prevalent, the utilization of triols and the like requires the ratio of acid to polyol to be stated more precisely as one equivalent of acid per equivalent of polyol.

In our composition utilizing 1% to 60% dicyclopentadiene (DCPD), the DCPD may be considered to replace a diol such as ethylene glycol in a molar ratio of about 2:1; thus the preferred molar ratios would be 1 DCPD:1 maleic:½ ethylene glycol. Blends of this DCPD resin and a polyester resin of the "general purpose" type are commonly made and would be a practical use for this invention.

The unsaturated polyesters useful in this invention may be prepared from an acid mixture wherein the unsaturated polycarboxylic acid comprises as little as 20 mole percent of the total acids present, although it is generally preferred that the unsaturated polycarboxylic acid comprises about 30% or more of the total acid content.

Some of the unsaturated polycarboxylic acids useful in preparing unsaturated polyesters used in this invention include:

| | |
|---|---|
| Maleic acid | Citraconic acid |
| Fumaric acid | Glutaconic acid |
| Itaconic acid | Chloromaleic acid |
| Mesaconic acid | | and the like, wherein the term "acid" is used to include the corresponding anhydrides where such anhydrides exist.

Some of the saturated and aromatically unsaturated polycarboxylic acids optionally useful in preparing unsaturated polyesters used in this invention include:

| | |
|---|---|
| Phthalic acid | Isophthalic acid |
| Tetrahydrophthalic acid | Hexahydrophthalic acid |
| Endomethylene tetrahydrophthalic acid | |
| Tetrachlorophthalic acid | Glutaric acid |
| Hexachloroendomethylene tetrahydrophthalic acid | |
| Succinic acid | Suberic acid |
| Adipic acid | Sebacic acid | and the like, wherein the term "acid" includes the corresponding anhydrides where such anhydrides exist. The >C=C< groups of the aromatic unsaturated polycarboxylic acids are relatively unreactive and do not participate to any substantial degree in polymerization reactions occurring between the unsaturation group of the polyester, as provided by the alpha, beta-ethylenically unsaturated acid present, such as maleic acid, and the ethylenically unsaturated monomer, such as styrene as described elsewhere herein.

Polyols useful in preparing polyesters for use in this invention are polyfunctional alcohols of the type conventionally utilized in polyester preparation. Such polyols include:

| | |
|---|---|
| Ethylene glycol | 1,5 propanediol |
| Propylene glycol | Triethylene glycol |
| Butylene glycol | Glycerol |
| Diethylene glycol | 1,4,6-hexanetriol |
| Trimethylolpropane | Trimethylolethane |
| Dipropylene glycol | Pentaerythritol |
| Neopentyl glycol | |

Alkoxylated 2,2-bis(4-hydroxyphenyl) propane and the like. Although diols are generally preferred in the preparation of unsaturated polyesters, the more functional polyols, i.e. polyols having a functionality of about 3–5, are frequently used.

As indicated above, dicyclopentadiene is included in amounts from 1% to 60%, preferably about 20% to about 55% of the polyester resin, and may be considered a normal part of the "base resin" as used herein.

Liquid resin properties measured in the experiments reported below were gel time, (reported in the tables herein in minutes and seconds, as 13:17, for example), room temperature interval time, which is the time between gelation and the exothermic peak, room temperature exothermic peak which is the highest temperature reached in a 100 g mass of resin during the curing process, Brookfield viscosity, and Barcol hardness by ASTM D2583. For volatile emissions, we followed the Rule 1162 Standard Method for Static Volatile Emissions of the South Coast Air Quality Management District (California) which is incorporated herein by reference. This test is accepted as a predictor of volatile emissions in the workplace during spray-up lamination procedures. Its results are reported in two ways—grams per square meter of weight loss, and the time of emissions, in minutes and seconds. The latter measurement entails noting the point in time in which weight loss is no longer recorded, thus requiring that weight be monitored beyond the time noted.

The test requirements are as follows: An environment at 77° F. and 50% relative humidity is maintained. If a controlled environment is not available, conditions should be reported for which measurements are made. A 200 gm pre-promoted resin is weighed out into a suitable dry and clean container. The container is covered and placed in a 25° C. temperature bath. A balance is placed in a draft free enclosure. A gallon lid is cleaned with solvent and wiped dry. The diameter is measured to the nearest 0.1 cm. The gallon lid is placed on an inverted paper or plastic cup mounted on the balance pan. A bent paper clip is positioned in the center of the gallon lid. This weight (TARE WEIGHT) is recorded. The container is taken from the temperature bath and an appropriate volumetric or weight measure of catalyst is added. A timer is started at this point. The catalyst is mixed with the resin for one minute. The INITIAL WEIGHT is determined by pouring 100.0±0.5 gm of catalyzed resin into the can lid and recording the weight. Next, the paper clip is used to determine when the resin has hardened sufficiently to allow the resin or lid to be lifted. The time (gel time) is recorded at this point. The resin is then allowed to harden in the can lid and every 15 minutes it is reweighed until concurrent weights agree to within 0.05 gm. This is recorded as the FINAL WEIGHT. The entire procedure should be repeated until duplicate samples agree to the nearest 5 gm/m².

The volatile emissions per square meter are calculated as follows:

$$\text{Volatile Losses per Square Meter} = \frac{\text{INITIAL WEIGHT} - \text{FINAL WEIGHT}}{\text{Area of Sample in Square Meters}}$$

A volatility of 20.0 g/m² or less, as measured by the test of Section 1162 of the Regulations of the South Coast (California) Air Quality District, was significantly achieved by applicants in the present invention. The resins of the present invention are superior to prior art resins in that they emit no more than 20 grams per square meter as measured by the Section 1162 test, and typically are less than 10 grams per square meter.

The clear castings tests adopted were as follows:
1. Tensile strength—ASTM D638.
2. Tensile modulus—ASTM D638.
3. Elongation—ASTM D638.
4. Flexural strength—ASTM D790.
5. Flexural modulus—ASTM D790.
6. Heat deflection temperature—ASTM D648.
7. Water absorption at 150° F.— ASTM D570 (modified).

The water absorption test was modified as follows: the temperature was set as 150° F. and long term immersion was set as one week.

Dicyclopentadiene is included as an ingredient of the unsaturated polyester portion of our composition. Unsaturated polyester compositions which contain dicyclopentadiene are well known and may be exemplified by those disclosed by Curtis in U.S. Pat. Nos. 4,233,432 and 4,246,367 and Nelson in U.S. Pat. Nos. 4,029,848 and 4,148,765; the entire disclosures of all four of these patents are included herein by reference. Generally speaking, the base polyesters we use in this invention include all the base polyesters otherwise described herein in which about 1% to about 60 weight percent dicyclopentadiene ("DCPD") is included (based on the total weight of polyester including DCPD). About 20 to about 52.5% DCPD is preferred, but about 1% to about 55% by weight may be used with good effect. The following Table I shows results of tests where such DCPD-included formulations have been used as the base polyester with the other ingredients of our invention.

In Table I, the Resin C contains about 52.5 weight percent DCPD. Its molecular composition is 1.00 mole of maleic anhydride, 0.60 mole of ethylene glycol and 1.13 moles DCPD. Sartomer 480 is ethoxylated bisphenol-A dimethacrylate where m and n in the above formula, are each 5. Sartomer 348 is ethoxylated bisphenol-A dimethacrylate where m and n in the above formula are both 1. Mod L is 25% hydroquinone and 75% propylene glycol. It may be seen that the formulation of the present invention designated as C-2 performs very well, having excellent marks for tensile strength, flexural strength and other physical properties while maintaining very low emissions and good working properties—compare the viscosities of the formulations, for example. The emissions test designated 1162 refers to the California South Coast Air Quality Management District Rule 1162 Standard Method for Static Volatile Emissions. The emissions test expressed in min:sec represents the time interval during which emissions occurred. These materials were cured with 0.30 Co (12%), 0.20 potassium (16%), 0.30 N,N-dimethylacetoacetamide (EASTMAN DMAA) and 1.50% methyl ethyl ketone peroxide (Hi Point 90).

Formulation C-2 performs well as stated above, but we have found that formulations such as C-2, having significant amounts of cyclohexyl methacrylate in the absence of vinyl toluene, demonstrate internally varied rates of polymerization, resulting in a tendency of the cyclohexyl methacrylate to become isolated and somewhat concentrated prior to its polymerization. Thus our preferred compositions have no more than 10% cyclohexyl methacrylate.

TABLE I

| | Low VOC Laminating Resins Based on a DCPD Polyester Polymer | | | | | | |
|---|---|---|---|---|---|---|---|
| Resin | J-1 | K-1 | L-1 | N-1 | A-2 | B-2 | C-2 |
| Composition | | | | | | | |
| Resin C | 40.00 | 35.00 | 35.00 | 35.00 | 35.00 | 35.00 | 30.00 |
| Sartomer 480 | 15.00 | 20.00 | 15.00 | 15.00 | 25.00 | 25.00 | 20.00 |
| Sartomer 348 | 20.00 | 20.00 | 15.00 | 20.00 | 10.00 | 10.00 | 15.00 |
| EG Dimethacrylate | 25.00 | 25.00 | 35.00 | 20.00 | 10.00 | 5.00 | 15.00 |
| Cyclohexyl Meth. | — | — | — | — | 20.00 | 25.00 | 20.00 |
| Vinyl Toluene | — | — | — | 10.00 | — | — | — |
| Mod L | 00.06 | 00.06 | 00.06 | 00.12 | 00.15 | 00.15 | 00.15 |
| Resin Properties | | | | | | | |
| Gel Time, min:sec | 12:19 | 12:58 | 09:45 | 17:25 | 20:48 | 33:23 | 21:10 |
| Interval, min:sec | 03:37 | 03:47 | 04:05 | 04:00 | 05:40 | 08:52 | 06:30 |

TABLE I-continued

Low VOC Laminating Resins Based on a DCPD Polyester Polymer

| Resin | J-1 | K-1 | L-1 | N-1 | A-2 | B-2 | C-2 |
|---|---|---|---|---|---|---|---|
| Exotherm, °F. | 259 | 262 | 285 | 286 | 243 | 233 | 265 |
| Viscosity, cps @ 75° F. | 1,138 | 620 | 390 | 440 | 436 | 418 | 216 |
| Barcol-45 minutes | 52.1 | 49.9 | 51.0 | 49.3 | 41.0 | 29.8 | 42.7 |
| -one hour | 51.8 | 50.6 | 51.4 | 50.3 | 40.9 | 37.6 | 45.9 |
| -two hours | 52.2 | 51.1 | 52.1 | 51.0 | 41.8 | 38.5 | 47.3 |
| -three hours | 52.3 | 51.0 | 52.2 | 51.0 | 42.0 | 39.0 | 47.3 |
| -four hours | 52.2 | 51.4 | 52.3 | 51.2 | 40.7 | 39.0 | 47.4 |
| -24 hours | 53.8 | 52.3 | 52.7 | 51.6 | 45.6 | 41.8 | — |
| 1162 Emissions, G/M2 | 11.5 | 04.2 | 04.2 | 11.5 | 04.8 | 02.4 | 04.8 |
| Emissions, min:sec | 20:40 | 28:01 | 09:01 | 20:12 | 49:37 | 35:10 | 50:35 |
| Properties of a Clear Casting | | | | | | | |
| HDT, °F. | 200 | 205 | 241 | 208 | 146 | 138 | 168 |
| Tensile Str., psi | 4,173 | 5,034 | 4,269 | 7,018 | 9,574 | 9,818 | 9,317 |
| Ten Mod., 10-6 psi | 0.527 | 0.521 | 0.551 | 0.515 | 0.426 | 0.402 | 0.458 |
| Elongation, % | 0.9 | 1.1 | 0.8 | 1.6 | 3.3 | 4.6 | 2.6 |
| Flexural Str., psi | 10,162 | 11,753 | 11,219 | 12,669 | 15,189 | 15,700 | 15,590 |
| Flex Mod., 10-6 psi | 0.529 | 0.508 | 0.541 | 0.491 | 0.571 | 0.618 | 0.517 |
| Water Absorption @ 150° F. | | | | | | | |
| 24 hours | 0.94 | 1.05 | 0.94 | 0.88 | 1.11 | 1.14 | 0.98 |
| seven days | 1.65 | 1.74 | 1.72 | 1.44 | 1.90 | 1.89 | 1.64 |

TABLE II

Low VOC Laminating Resins Based on DCPD Polyester Polymer

| Resin | N-1 | J-3 | K-3 | L-3 | M-3 |
|---|---|---|---|---|---|
| Composition | | | | | |
| Resin C | 35.00 | 30.00 | 30.00 | 30.00 | 35.00 |
| Sartomer 480 | 15.00 | 20.00 | 20.00 | 20.00 | 20.00 |
| Sartomer 348 | 20.00 | 20.00 | 15.00 | 20.00 | 20.00 |
| EG Dimethacrylate | 20.00 | 20.00 | 15.00 | 10.00 | 10.00 |
| Cyclohexyl Methacrylate | — | — | 10.00 | 10.00 | 10.00 |
| Vinyl Toluene | 10.00 | 10.00 | 10.00 | 10.00 | 05.00 |
| Mod L | 00.15 | 00.15 | 00.15 | 00.15 | 00.12 |
| 12% Cobalt | 00.30 | 00.30 | 00.30 | 00.30 | 00.30 |
| 16% Potassium | 00.20 | 00.20 | 00.20 | 00.20 | 00.20 |
| Dimethyl Acetoacetamide | 00.30 | 00.30 | 00.30 | 00.30 | 00.30 |
| Resin Properties | | | | | |
| Gel Time, min:sec | 19:42 | 20:47 | 21:10 | 20:35 | 23:05 |
| Interval, min:sec | 03:03 | 03:40 | 04:52 | 03:30 | 04:01 |
| Exotherm, °F. | 278 | 288 | 272 | 273 | 245 |
| Viscosity, cps @ 75° F. | 410 | 270 | 200 | 250 | 800 |
| Barcol-45 minutes | 39.1 | 42.8 | 44.5 | 39.5 | 42.7 |
| one hour | 48.0 | 46.5 | 46.8 | 43.4 | 42.5 |
| two hours | 48.2 | 47.4 | 47.9 | 44.3 | 47.4 |
| three hours | 48.5 | 48.7 | 47.5 | 45.3 | 47.2 |
| four hours | 49.0 | 48.4 | 47.6 | 45.8 | 47.5 |
| 24 hours | 49.3 | 48.7 | 47.8 | 46.6 | 47.6 |
| 1162 Emissions, G/M2 | 3.0 | 4.8 | 8.5 | 3.6 | 2.4 |
| Emissions, min:sec | 30:22 | 29:53 | 37:12 | 38:14 | 35:03 |
| Properties of a Clear Casting | | | | | |
| HDT, °F. | 204 | 205 | 177 | 175 | 170 |
| Tensile Strength, psi | 6,070 | 7,390 | 9,170 | 9,220 | 8,637 |
| Ten Modulus, 10-6 psi | 0.363 | 0.357 | 0.357 | 0.349 | 0.358 |
| Elongation, % | 1.80 | 2.50 | 3.40 | 3.40 | 3.00 |
| Flexural Strength, psi | 17,060 | 17,430 | 17,440 | >18,360 | 17,630 |
| Flex Modulus, 10-6 psi | 0.689 | 0.693 | 0.630 | 0.560 | 0.565 |
| Water Absorption @ 150° F. | | | | | |
| 24 hours | 0.86 | 0.90 | 0.59 | 1.14 | 0.99 |
| seven days | 1.41 | 1.51 | 1.30 | 1.74 | 1.47 |

| Resin | S-3 | T-3 | C-2 | A-4 | B-4 | C-4 |
|---|---|---|---|---|---|---|
| Composition | | | | | | |
| Resin C | 30.00 | 30.00 | 30.00 | 30.00 | 30.00 | 30.00 |

TABLE II-continued

Low VOC Laminating Resins Based on DCPD Polyester Polymer

| | | | | | | |
|---|---|---|---|---|---|---|
| Sartomer 480 | 20.00 | 20.00 | 20.00 | 20.00 | 20.00 | 20.00 |
| Sartomer 348 | 15.00 | 15.00 | 15.00 | 15.00 | 15.00 | 20.00 |
| EG Dimethacrylate | 20.00 | 25.00 | 15.00 | 20.00 | 15.00 | 15.00 |
| Cyclohexyl Methacrylate | 05.00 | 05.00 | 20.00 | — | — | — |
| Vinyl Toluene | 10.00 | 05.00 | — | 15.00 | 20.00 | 15.00 |
| Mod L | 00.15 | 00.12 | 00.15 | 00.18 | 00.22 | 00.18 |
| 12% Cobalt | 00.30 | 00.30 | 00.30 | 00.30 | 00.30 | 00.30 |
| 16% Potassium | 00.20 | 00.20 | 00.20 | 00.20 | 00.20 | 00.20 |
| Dimethyl Acetoacetamide | 00.30 | 00.30 | 00.30 | 00.30 | 00.30 | 00.30 |
| Resin Properties | | | | | | |
| Gel Time, min:sec | 22:00 | 22:30 | 21:10 | 16:42 | 21:00 | 17:40 |
| Interval, min:sec | 04:30 | 03:47 | 06:30 | 03:34 | 04:13 | 03:39 |
| Exotherm, °F. | 289 | 288 | 265 | 295 | 265 | 258 |
| Viscosity, cps @ 75° F. | 190 | 210 | 216 | 160 | 140 | 228 |
| Barcol-45 minutes | 40.1 | 40.8 | 42.7 | 38.6 | 40.2 | 42.6 |
| one hour | 46.8 | 48.0 | 45.9 | 44.0 | 43.7 | 45.0 |
| two hours | 47.6 | 49.3 | 47.3 | 46.0 | 45.8 | 45.0 |
| three hours | 47.6 | 49.9 | 47.3 | 46.3 | 45.6 | 46.0 |
| four hours | 47.8 | 50.2 | 47.4 | 46.7 | 45.7 | 46.7 |
| 24 hours | 47.9 | 49.8 | — | 48.6 | 46.3 | 47.5 |
| 1162 Emissions, G/M2 | 3.6 | 1.2 | 4.8 | 3.0 | 3.0 | 9.1 |
| Emissions, min:sec | 26:23 | 23:55 | 50:35 | 18:25 | 26:00 | 28:50 |
| Properties of a Clear Casting | | | | | | |
| HDT,°F. | 180 | 199 | 168 | 190 | 184 | 186 |
| Tensile Strength, psi | 9,060 | 7,260 | 9,317 | 4,320 | 8,170 | 6,960 |
| Ten Modulus, 10-6 psi | 0.488 | 0.503 | 0.458 | 0.503 | 0.421 | 0.455 |
| Elongation, % | 2.30 | 1.60 | 2.60 | 1.00 | 2.60 | 1.80 |
| Flexural Strength, psi | 17,550 | 13,800 | 15,590 | 13,530 | 14,350 | 14,980 |
| Flex Modulus, 10-6 psi | — | — | 0.517 | 0.444 | 0.428 | 0.447 |
| Water Absorption @ 150° F. | | | | | | |
| 24 hours | 0.92 | 1.04 | 0.98 | | | |
| seven days | 1.32 | 1.78 | 1.64 | | | |

*100 parts by weight maleic anhydride, 38 parts ethylene glycol, 152 parts dicyclopentadiene.

Where vinyl toluene is used, we prefer the formulation to contain about 5% to about 15%; not more than about 35% should be used.

Table II shows the results of several formulations which achieved very low emissions results. As indicated above, we do not consider any such formulation to be within our invention if its viscosity is less than 100 cps or more than 400 cps at 75° F. Thus formulations N-1 and M-3 are outside our invention.

In Table III, the results with eleven DCPD-containing formulations that contain various amounts of styrene are shown.

The results indicate that when a DCPD polyester resin is used with the ethoxylated BPA dimethacrylates (Sartomers 348 and 480), styrene may be used as the third component (reactive solvent) without seriously increasing the emissions or other physical properties of the resin.

Table IV is a comparison of resin formulations containing vinyl toluene compared to others that are identical except that the vinyl toluene is replaced with styrene. This data shows that the use of styrene in amounts of 20% or less does not increase the emissions, but at 30% or more, emissions do increase when styrene is substituted for vinyl toluene in these resins.

TABLE III

Low VOC Laminating Resins Based on DCPD Polyester Polymer

| Resin | I-4 | W-4 | K-4 | X-4 | L-4 | V-4 |
|---|---|---|---|---|---|---|
| Composition | | | | | | |
| Resin C | 30.00 | 30.00 | 30.00 | 30.00 | 30.00 | 30.00 |
| Sartomer 480 | 20.00 | 20.00 | 20.00 | 20.00 | 20.00 | 20.00 |
| Sartomer 348 | 20.00 | 20.00 | 15.00 | 15.00 | 15.00 | 15.00 |
| EG Dimethacrylate | 10.00 | 10.00 | 15.00 | 15.00 | 20.00 | 20.00 |
| Cyclohexyl Methacrylate | 10.00 | 10.00 | 10.00 | 10.00 | 05.00 | 05.00 |
| Styrene | 10.00 | 10.00 | 10.00 | 10.00 | 10.00 | 10.00 |
| Mod L | 00.17 | 00.15 | 00.17 | 00.15 | 00.17 | 00.15 |
| 12% Cobalt | 00.30 | 00.30 | 00.30 | 00.30 | 00.30 | 00.30 |
| 16% Potassium | 00.20 | 00.20 | 00.20 | 00.20 | 00.20 | 00.20 |
| Dimethyl Acetoacetamide | 00.30 | 00.30 | 00.30 | 00.30 | 00.30 | 00.30 |
| Resin Properties | | | | | | |
| Gel Time, min:sec | 19:30 | 19:00 | 17:50 | 17:40 | 16.00 | 17:50 |
| Interval, min:sec | 03:00 | 03:55 | 03:13 | 03:17 | 06:21 | 03:14 |

TABLE III-continued

Low VOC Laminating Resins Based on DCPD Polyester Polymer

|  |  |  |  |  |  |  |
|---|---|---|---|---|---|---|
| Exotherm, °F. | 254 | 234 | 270 | 248 | 251 | 244 |
| Viscosity, cps @ 75° F. | 285 | 280 | 195 | iso | 180 | 200 |
| Barcol-45 minutes | 40.3 | 41.3 | 42.7 | 42.8 | 41.2 | 42.4 |
| one hour | 44.3 | 43.6 | 45.1 | 45.2 | 45.4 | 44.8 |
| two hours | 45.6 | 46.3 | 47.3 | 46.3 | 46.8 | 46.4 |
| three hours | 45.9 | 46.4 | 47.1 | 46.6 | 47.5 | 47.0 |
| four hours | 46.0 | 46.3 | 47.1 | 46.8 | 48.1 | 46.9 |
| 24 hours | 47.4 | 46.5 | 47.1 | 46.9 | 47.9 | 47.2 |
| 1162 Emissions, G/M2 | 5.5 | 3.6 | 4.8 | 0.6 | 3.6 | 1.8 |
| Emissions, min:sec | 23:45 | 36:10 | 30:15 | 19:33 | 26:23 | 18:56 |
| Properties of a Clear Casting |  |  |  |  |  |  |
| HDT,°F. | 175 | 170 | 181 | 180 | 190 | 190 |
| Tensile Strength, psi | 10,460 | 7,490 | 8,480 | 8,650 | 7,030 | 7,550 |
| Ten Modulus, 10-6 psi | 0.488 | 0.475 | 0.476 | 0.443 | 0.453 | 0.467 |
| Elongation, % | 2.20 | 1.90 | 2.30 | 2.40 | 1.90 | 2.10 |
| Flexural Strength, psi | 16,670 | 15,080 | 15,630 | 14,390 | 13,610 | 15,500 |
| Flex Modulus, 10-6 psi | 0.443 | 0.496 | 0.891 | 0.533 | 0.476 | 0.518 |
| Water Absorption @ 150° F. |  |  |  |  |  |  |
| 24 hours | 0.99 | 0.91 | 0.98 | 0.99 | 1.02 | 0.94 |
| seven days | 1.52 | 1.53 | 1.56 | 1.64 | 1.66 | 1.61 |
| Resin | J-4 | U-4 | M-4 | Y-4 | Z-4 |  |
| Composition |  |  |  |  |  |  |
| Resin C | 30.00 | 30.00 | 30.00 | 30.00 | 30.00 |  |
| Sartomer 480 | 20.00 | 20.00 | 20.00 | 20.00 | 15.00 |  |
| Sartomer 348 | 20.00 | 15.00 | 20.00 | 20.00 | 15.00 |  |
| EG Dimethacrylate | 20.00 | 15.00 | — | — | — |  |
| Cyclohexyl Methacrylate | — | — | — | — | — |  |
| Styrene | 10.00 | 20.00 | 30.00 | 30.00 | 40.00 |  |
| Mod L | 00.17 | 00.22 | 00.20 | 00.22 | 00.25 |  |
| 12% Cobalt | 00.30 | 00.30 | 00.30 | 00.30 | 00.30 |  |
| 16% Potassium | 00.20 | 00.20 | 00.20 | 00.20 | 00.20 |  |
| Dimethyl Acetoacetamide | 00.30 | 00.30 | 00.30 | 00.30 | 00.30 |  |
| Resin Properties |  |  |  |  |  |  |
| Gel Time, min:sec | 16:15 | 18:40 | 14:00 | 15:40 | 17:30 |  |
| Interval, min:sec | 03:18 | 03:55 | 05:32 | 06:05 | 11:04 |  |
| Exotherm, °F. | 277 | 292 | 331 | 292 | 331 |  |
| Viscosity, cps @ 75° F. | 285 | 115 | 105 | 105 | 40 |  |
| Barcol-45 minutes | 42.5 | 42.0 | 35.4 | 37.2 | 26.5 |  |
| one hour | 45.6 | 43.4 | 39.4 | 40.2 | 35.2 |  |
| two hours | 47.9 | 44.5 | 40.2 | 40.5 | 38.4 |  |
| three hours | 47.8 | 44.9 | 40.0 | 41.0 | 38.7 |  |
| four hours | 49.0 | 45.0 | 40.2 | 41.6 | 39.5 |  |
| 24 hours | 48.0 | 45.7 | 39.6 | 42.5 | 39.6 |  |
| 1162 Emissions, G/M2 | 3.6 | 2.4 | 11.5 | 7.3 | 9.1 |  |
| Emissions, min:sec | 15:40 | 22:44 | 25:06 | 24:07 | 29:56 |  |
| Properties of a Clear Casting |  |  |  |  |  |  |
| HDT,°F. | 191 | 191 | 178 | 178 | 184 |  |
| Tensile Strength, psi | 8,630 | 9,300 | 8,750 | 8,790 | 8,500 |  |
| Ten Modulus, 10-6 psi | 0.486 | 0.510 | 0.435 | 0.489 | 0.488 |  |
| Elongation, % | 2.10 | 2.60 | 2.70 | 2.70 | 2.40 |  |
| Flexural Strength, psi | 16,420 | 17,160 | >16,670 | 16,000 | 16,830 |  |
| Flex Modulus, 10-6 psi | 0.925 | 0.471 | 0.823 | 0.552 | 0.549 |  |
| Water Absorption @ 150° F. |  |  |  |  |  |  |
| 24 hours | 1.05 | 0.97 | 0.86 | 0.79 | 0.87 |  |
| seven days | 1.69 | 1.52 | 1.32 | 1.35 | 1.21 |  |

TABLE IV

Low VOC Laminating Resins Based on DCPD Polyester Polymer

| Resin | I-4 | L-3 | K-4 | K-3 | L-4 | S-3 |
|---|---|---|---|---|---|---|
| Composition |  |  |  |  |  |  |
| Resin C | 30.00 | 30.00 | 30.00 | 30.00 | 30.00 | 30.00 |
| Sartomer 480 | 20.00 | 20.00 | 20.00 | 20.00 | 20.00 | 20.00 |
| Sartomer 348 | 20.00 | 20.00 | 15.00 | 15.00 | 15.00 | 15.00 |
| EG Dimethacrylate | 10.00 | 10.00 | 15.00 | 15.00 | 20.00 | 20.00 |

TABLE IV-continued

Low VOC Laminating Resins Based on DCPD Polyester Polymer

| | | | | | | |
|---|---|---|---|---|---|---|
| Cyclohexyl Methacrylate | 10.00 | 10.00 | 10.00 | 10.00 | 05.00 | 05.00 |
| Styrene | 10.00 | — | 10.00 | — | 10.00 | — |
| Vinyl Toluene | — | 10.00 | — | 10.00 | — | 10.00 |
| Mod L | 00.17 | 00.15 | 00.17 | 00.15 | 00.17 | 00.15 |
| 12% Cobalt | 00.30 | 00.30 | 00.30 | 00.30 | 00.30 | 00.30 |
| 16% Potassium | 00.20 | 00.20 | 00.20 | 00.20 | 00.20 | 00.20 |
| Dimethyl Acetoacetamide | 00.30 | 00.30 | 00.30 | 00.30 | 00.30 | 00.30 |
| Resin Properties | | | | | | |
| Gel Time, min:sec | 19:30 | 20:35 | 17:50 | 21:10 | 16.00 | 22:00 |
| Interval, min:sec | 03:00 | 03:30 | 03:13 | 04:52 | 06:21 | 04:30 |
| Exotherm, °F. | 254 | 273 | 270 | 272 | 251 | 289 |
| Viscosity, cps @ 75° F. | 285 | 250 | 195 | 200 | 180 | 190 |
| Barcol-45 minutes | 40.3 | 39.5 | 42.7 | 44.5 | 41.2 | 40.1 |
| one hour | 44.3 | 43.4 | 45.1 | 46.8 | 45.4 | 46.8 |
| two hours | 45.6 | 44.3 | 47.3 | 47.9 | 46.8 | 47.6 |
| three hours | 45.9 | 45.3 | 47.1 | 47.5 | 47.5 | 47.6 |
| four hours | 46.0 | 45.8 | 47.1 | 47.6 | 48.1 | 47.8 |
| 24 hours | 47.4 | 46.6 | 47.1 | 47.8 | 47.9 | 47.9 |
| 1162 Emissions, G/M2 | 5.5 | 3.6 | 4.8 | 8.5 | 3.6 | 3.6 |
| Emissions, min:sec | 23:45 | 38:14 | 30:15 | 37:12 | 26:23 | 26:23 |
| Properties of a Clear Casting | | | | | | |
| HDT, °F. | 175 | 175 | 181 | 177 | 190 | 180 |
| Tensile Strength, psi | 10,460 | 9,220 | 8,480 | 9,170 | 7,030 | 9,060 |
| Ten Modulus, 10-6 psi | 0.488 | 0.349 | 0.476 | 0.357 | 0.453 | 0.488 |
| Elongation, % | 2.20 | 3.40 | 2.30 | 3.40 | 1.90 | 2.30 |
| Flexural Strength, psi | 16,670 | >18,360 | 15,630 | 17,440 | 13,610 | 17,550 |
| Flex Modulus, 10-6 psi | 0.443 | 0.560 | 0.891 | 0.630 | 0.476 | — |
| Water Absorption @ 150° F. | | | | | | |
| 24 hours | 0.99 | 1.14 | 0.98 | 0.59 | 1.02 | 0.92 |
| seven days | 1.52 | 1.74 | 1.56 | 1.30 | 1.66 | 1.32 |

| Resin | J-4 | J-3 | U-4 | B-4 | Y-4 | N-4 |
|---|---|---|---|---|---|---|
| Composition | | | | | | |
| Resin C | 30.00 | 30.00 | 30.00 | 30.00 | 30.00 | 30.00 |
| Sartomer 480 | 20.00 | 20.00 | 20.00 | 20.00 | 20.00 | 20.00 |
| Sartomer 348 | 20.00 | 20.00 | 15.00 | 15.00 | 20.00 | 20.00 |
| EG Dimethacrylate | 20.00 | 20.00 | 15.00 | 15.00 | — | — |
| Cyclohexyl Methacrylate | — | — | — | — | — | — |
| Styrene | 10.00 | — | 20.00 | — | 30.00 | — |
| Vinyl Toluene | — | 10.00 | — | 20.00 | — | 30.00 |
| Mod L | 00.17 | 00.15 | 00.22 | 00.22 | 00.22 | 00.17 |
| 12% Cobalt | 00.30 | 00.30 | 00.30 | 00.30 | 00.30 | 00.30 |
| 16% Potassium | 00.20 | 00.20 | 00.20 | 00.20 | 00.20 | 00.20 |
| Dimethyl Acetoacetamide | 00.30 | 00.20 | 00.30 | 00.30 | 00.30 | 00.30 |
| Resin Properties | | | | | | |
| Gel Time, min:sec | 16:15 | 20:47 | 18:40 | 21:00 | 15:40 | 13.00 |
| Interval, min:sec | 03:18 | 03:40 | 03:55 | 04:13 | 06:05 | 05:22 |
| Exotherm, °F. | 277 | 288 | 292 | 265 | 292 | 261 |
| Viscosity, cps @ 75° F. | 285 | 270 | 115 | 140 | 105 | 150 |
| Barcol-45 minutes | 42.5 | 42.8 | 42.0 | 40.2 | 37.2 | 35.1 |
| one hour | 45.6 | 46.5 | 43.4 | 43.7 | 40.2 | 38.7 |
| two hours | 47.9 | 47.4 | 44.5 | 45.8 | 40.5 | 42.4 |
| three hours | 47.8 | 48.7 | 44.9 | 45.6 | 41.0 | 42.9 |
| four hours | 49.0 | 48.4 | 45.0 | 45.7 | 41.6 | 43.3 |
| 24 hours | 48.0 | 48.7 | 45.7 | 46.3 | 42.5 | 43.3 |
| 1162 Emissions, G/M2 | 3.6 | 4.8 | 2.4 | 3.0 | 7.3 | 3.0 |
| Emissions, min:sec | 15:40 | 29:53 | 22:44 | 26:00 | 24:07 | 17:07 |
| Properties of a Clear Casting | | | | | | |
| HDT,°F. | 191 | 205 | 191 | 184 | 178 | 165 |
| Tensile Strength, psi | 8,630 | 7,390 | 9,300 | 8,170 | 8,790 | 10,343 |
| Ten Modulus, 10-6 psi | 0.486 | 0.357 | 0.510 | 0.421 | 0.489 | 0.407 |
| Elongation, % | 2.10 | 2.50 | 2.60 | 2.60 | 2.70 | 4.00 |
| Flexural Strength, psi | 16,420 | 17,430 | 17,160 | 14,350 | 16,000 | >15,320 |
| Flex Modulus, 10-6 psi | 0.925 | 0.693 | 0.471 | 0.428 | 0.552 | 0.422 |
| Water Absorption @ 150° F. | | | | | | |
| 24 hours | 1.05 | 0.90 | 0.97 | 0.86 | 0.79 | 0.85 |
| seven days | 1.69 | 1.51 | 1.52 | 1.36 | 1.35 | 1.25 |

TABLE IV-continued

Low VOC Laminating Resins Based on DCPD Polyester Polymer

| Resin | Z-4 | R-4 |
|---|---|---|
| Composition | | |
| Resin C | 30.00 | 30.00 |
| Sartomer 480 | 15.00 | 15.00 |
| Sartomer 348 | 15.00 | 15.00 |
| EG Dimethacrylate | — | — |
| Cyclohexyl Methacrylate | — | — |
| Styrene | 40.00 | — |
| Vinyl Toluene | — | 40.00 |
| Mod L | 00.17 | 00.17 |
| 12% Cobalt | 00.30 | 00.30 |
| 164 Potassium | 00.20 | 00.20 |
| Dimethyl Acetoacetamide | 00.30 | 00.30 |
| Resin Properties | | |
| Gel Time, min:sec | 17:30 | 10:40 |
| Interval, min:sec | 11:04 | 06:23 |
| Exotherm, °F. | 331 | 273 |
| Viscosity, cps @ 75° F. | 40 | 50 |
| Barcol-45 minutes | 26.5 | 34.9 |
| one hour | 35.2 | 36.5 |
| two hours | 38.4 | 37.4 |
| three hours | 38.7 | 37.6 |
| four hours | 39.5 | 37.6 |
| 24 hours | 39.6 | 38.9 |
| 1162 Emissions, G/M2 | 9.1 | 4.8 |
| Emissions, min:sec | 29:56 | 28:40 |
| Properties of a Clear Casting | | |
| HDT, °F. | 184 | 174 |
| Tensile Strength, psi | 8,500 | 8,062 |
| Ten Modulus, 10-6 psi | 0.488 | 0.443 |
| Elongation, % | 2.40 | 2.20 |
| Flexural Strength, psi | 16,830 | >14,120 |
| Flex Modulus, 10-6 psi | 0.549 | 0.415 |
| Water Absorption @ 150° F. | | |
| 24 hours | 0.87 | 0.71 |
| seven days | 1.21 | 0.93 |

Our invention therefore may be restated as a laminating resin composition comprising (A) a base resin comprising about 10% to about 50% by weight glycols, about 20% to about 50% unsaturated polycarboxylic acids or derivatives thereof, including up to about 30% saturated dicarboxylic acids, and about 1% to about 60% dicyclopentadiene, (B) alkoxylated bisphenol-A dimethacrylate having at least two alkoxy groups, in a weight ratio of (A) to (B) of about 1.5:1 to about 0.6:1, and (C) about 25% to about 65%, based on the total of (A) and (B), of a compound selected from the group consisting of styrene, vinyl toluene, divinyl benzene and ethylene glycol dimethacrylate.

As indicated above, the cyclohexyl methacrylate need not be used at all. Accordingly, our invention includes a composition comprising simply the base polyester polymer, the alkoxylated bisphenol-A dimethacrylate and the third component as described above. The ethoxylated bisphenol-A dimethacrylates have totals of 2 and 10 ethoxy groups arranged more or less evenly on each side of the bisphenol-A; however, we may employ a single compound or compounds having any variation of combinations of ethoxy or propoxy groups from two to about 20 groups.

We claim:

1. Method of laminating a solid formed body without creating significant volatile emissions in the workplace comprising (a) providing a forming surface having a desired positive or negative shape, (b) providing a liquid mixture comprising (1) about two parts by weight unsaturated polyester resin, said polyester resin composed of glycols, unsaturated and saturated polycarboxylic acids and 1–60% by weight of dicyclopentadiene, (2) about one part to about four parts by weight alkoxylated bisphenol-A diacrylate or dimethacrylate, (3) about 20% to about 60%, based on the total weight of (1) and (2), of vinyl toluene, and (4) an effective amount of a polymerization catalyst, and wherein said liquid mixture emits no more than 20 grams per square meter as measured by Section 1162 of the Regulations of the South Coast (California) Air Quality District, (c) applying said mixture to said forming surface at ambient temperatures in layers while permitting said layers incrementally to polymerize, thereby building said shaped article, and (d) removing the finished solid formed body from said forming surface.

2. Method of claim 1 wherein the alkoxylated BPA is a dimethacrylate and has about 2 to about 20 alkoxy groups.

3. Method of claim 1 wherein said mixture is applied by spraying.

4. Method of claim 1 wherein the amount of dicyclopentadiene is about 20% to about 55% of the polyester resin.

5. Method of claim 1 wherein said mixture includes glass fibers.

6. Method of claim 1 wherein the alkoxy groups of said alkoxylated bisphenol-A diacrylate or dimethacrylate are ethoxy groups.

7. Method of claim 2 wherein said alkoxylated BPA dimethacrylate has from 2 to 10 alkoxy groups.

* * * * *